(No Model.)

W. H. BULCROFT & R. A. JOHNSTON.
NUT LOCK.

No. 244,793. Patented July 26, 1881.

Witnesses.

Inventors.
Wm. H. Bulcroft,
Robt. A. Johnston,
per
F. A. Lehmann,
atty

UNITED STATES PATENT OFFICE.

WILLIAM H. BULCROFT AND ROBERT A. JOHNSTON, OF CLEVELAND, OHIO, ASSIGNORS OF ONE-THIRD TO ALPHONSE CHARBONNEAU, OF SAME PLACE.

NUT-LOCK.

SPECIFICATION forming part of Letters Patent No. 244,793, dated July 26, 1881.

Application filed May 16, 1881. (No model.)

*To all whom it may concern:*

Be it known that we, WILLIAM H. BULCROFT and ROBERT A. JOHNSTON, of Cleveland, in the county of Cuyahoga and State of Ohio, have invented certain new and useful Improvements in Nut-Locks; and we do hereby declare the following to be a full, clear, and exact description of the invention, such as will enable others skilled in the art to which it pertains to make and use it, reference being had to the accompanying drawings, which form part of this specification.

Our invention relates to an improvement in nut-locks; and it consists in the combination of a washer, having pivoted thereto a suitable wire catch with the nut, a secondary washer which passes over the outer side of the nut, and which has pivoted to it a curved piece of wire, over the outer end of which the catch is made to catch for the purpose of locking the nut in position, as will be more fully described hereinafter.

The object of our invention is to provide a cheap, simple, and efficient nut-lock, and one which is applicable to all bolts and nuts now in use.

Figure 1:
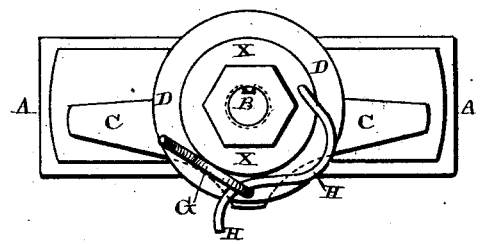
Figure 2:
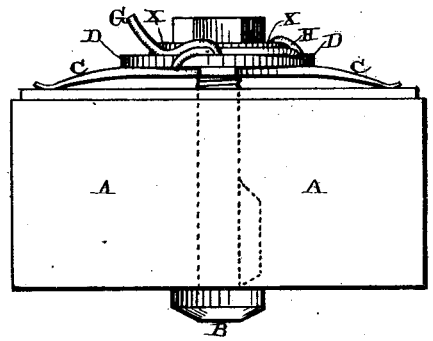
Figure 3:
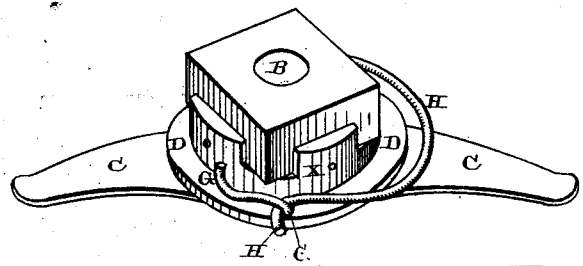
Figure 4:
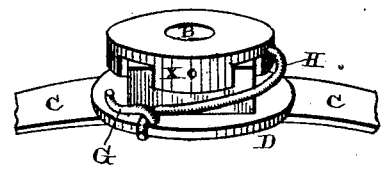
Figure 5:
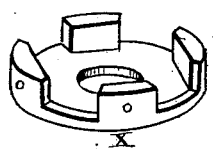

Figure 1 is a plan view of our invention. Fig. 2 is a side elevation of the same. Fig. 3 is a perspective showing the washer used in connection with a square nut. Fig. 4 is a similar view, showing the washer applied to the outer side of the square nut. Fig. 5 is a perspective of the washer used upon square nuts.

A represents the body of a rail or a piece of wood or iron of any kind, through which the bolt B is passed. Although this nut-lock is intended especially for railroads, it is applicable for use wherever a lock is required. Where there is a considerable vibration, as in railroad-rails, and where it is necessary that there should be a certain amount of elasticity between the parts, so as to compensate for the scale which peals off of the rail and fish-bar, the spring C will be used. Where our lock is to be applied where there is no vibration or movement of the parts this spring will not be used.

Passed over the end of the bolt is the washer D, which has a small projection made upon one side of the hole through its center, and this projection catches in a groove which is made in the side of the bolt. This groove in the bolt will be made by machinery while the bolt is being rolled, and the projection upon the inside of the washer will be formed at the same time that the washer is stamped out. The head end of the bolt being provided with a lug or with angular sides, is prevented from turning around after it has been once passed through the body, and as the bolt cannot turn and as the washer is prevented from turning by its projection, it will readily be seen that the washer is held rigidly in position under all circumstances. Should there be no provision made upon the head end of the bolt to prevent it from turning, the bolt and the washer being connected together, it would make no difference whether the bolt turns or not, for if it did turn it would carry the washer, the nut, and the lock around with it, and that without in any way loosening the nut.

Where an octagonal-shaped nut is used a secondary washer, X, is used, which will consist of nothing more than a thin plate having an octagonal-shaped hole punched through it just large enough to fit over the nut.

Pivoted in the washer, which is placed under the nut, is a suitable wire catch, G, and pivoted to the secondary washer which is passed over the top of the nut, is a long curved wire, H, which extends around the side of the nut and has its outer end to catch under the catch G. After this wire has been made to catch under the catch G, the catch is swung around into position over the top of the washer, when its end or corner will fall into a recess that is made in the top of the washer, and thus hold it securely in position. Where the parts are thus locked it will be seen that a large washer is secured to the bolt and that the small washer which passes over the sides of the nut is locked to the lower washer by means of the curved wire and the catch G. In this position the nut can readily be loosened by swinging the catch outward, so as to release the end of the wire.

When a square nut is used, the washer for locking it in position will be formed as shown in Fig. 5, so that it will fit either over the top of the nut or underneath it, as may be preferred. The catch G and the wire H will be used in the same manner; but instead of having the wire H pivoted to the washer X, as shown in Figs. 1 and 2, there will be a series of holes made through the outer side of the washer X, into any one of which the bent end of the wire will be made to catch. When this washer is passed over the bolt in advance of the nut the wire will be pivoted to the washer, as shown in Figs. 1 and 2, but will be made detachable therefrom, so that it can be applied to any one of the holes which is made to receive its inner end. Where the washer is to be placed over the top of the nut, the wire may be pivoted to the washer instead of being made removable therefrom.

A nut-lock thus constructed is cheap, simple, and durable, and the nuts cannot become unlocked under any circumstances unless the wires are first disengaged from each other, which can never take place by accident.

Having thus described our invention, we claim—

The combination of the grooved bolt, a washer provided with a projection for locking it to the bolt, a nut, a washer to lock the nut in place, a curved wire, which is attached to the washer for the nut, and a catch for holding the outer end of the wire in position, the parts being arranged and combined to operate substantially as described.

In testimony whereof we affix our signatures in presence of two witnesses.

WILLIAM H. BULCROFT.
ROBERT A. JOHNSTON.

Witnesses:
W. E. SLOSSON,
THOS. R. MILLER.